United States Patent [19]
Schlecker

[11] Patent Number: 5,609,239
[45] Date of Patent: Mar. 11, 1997

[54] LOCKING SYSTEM

[75] Inventor: Helmut Schlecker, Plochingen, Germany

[73] Assignee: Thyssen Aufzuege GmbH, Neuhausen A.D.F., Germany

[21] Appl. No.: 405,809

[22] Filed: Mar. 16, 1995

[30] Foreign Application Priority Data

Mar. 21, 1994 [DE] Germany .................. 94 04 771.5

[51] Int. Cl.$^6$ ............................................. B65G 17/32
[52] U.S. Cl. ................ 198/680; 198/377; 198/687.1; 118/423
[58] Field of Search ....................... 198/377, 465.4, 198/687.1, 681, 682, 803.2, 680; 104/172.4, 162; 118/324, 423, 500

[56] References Cited

U.S. PATENT DOCUMENTS

| | | | |
|---|---|---|---|
| 2,664,993 | 1/1954 | Mullen et al. | 198/682 |
| 4,341,161 | 7/1982 | Morita et al. | 198/680 |
| 4,408,539 | 10/1983 | Tsumaki et al. | 198/680 |
| 4,724,944 | 2/1988 | Koshigai et al. | 198/680 |
| 4,831,962 | 5/1989 | Gros | 198/681 |
| 5,234,096 | 8/1993 | Saruki et al. | 198/680 |
| 5,364,469 | 11/1994 | Wakabayashi | 198/465.4 |

Primary Examiner—Joseph E. Valenza
Attorney, Agent, or Firm—Shlesinger, Arkwright & Garvey

[57] ABSTRACT

A mounting structure or holding frame movable along a conveyor system has a locking device which includes a seat with a recess to accommodate a connection component of a workpiece, and a latch pivotable to open or close the recess and bearing a start roller. A securing rail adapted to block the latch in its open or closed position is movable in parallel to the pivotal plane of the latch an bears a start roller. Both start rollers are controlled by cams disposed along the conveying path of the mounting structure.

12 Claims, 3 Drawing Sheets

LOCKING SYSTEM

The invention concerns a locking system present at a mounting structure, ie a holding frame displaced by a conveyor, said holding frame servicing one or more workpieces or manufactured components being processed.

To simplify the handling of large workpieces, for instance rough bodies in automobile manufacture, these are gripped by the holding frame at lacquer traverses, ie enameling crossbeams affixed to the body base and are guided by the conveyor through diverse work stations, immersion baths for cleaning, priming and enameling and thereafter through further assembly and finishing paths.

In order that the component being finished be accessible from all sides at an assembly path, for instance to install brake conduits in the body base, holding frames are known which transversely enclose the body and are roller-supported at a displaceable carrier of a suspension conveying system, said frames furthermore being pivotable along their arcuate shape. The free ends of the open arcuate shape are fitted with lockable seats for the enameling crossbeams, however an enameling crossbeam can be seated and locked only when the conveying system is at rest. Furthermore stationary actuation devices and costly control means are required to monitor the completion of a seating procedure and the reliability of locking along the conveyed path.

The object of the invention is to improve an assembly of the above described kind in such manner that the holding frame automatically shall seize and lock the workpiece without thereby stopping or delaying the continuous motion of the conveying system. The locking system shall be secured both in its closed and open states against displacements caused by unanticipated external effects and the entire assembly shall be characterized by compactness and operational reliability as well as by a simple and rugged design.

The above object is solved by the invention as follows:
in that the latch pivotable between and open and a closed seat positions is solidly joined to a first drive member, in that a securing rail pivoting parallel to the plane of pivoting of the latch between a holding and a release position is linked to a second drive member and comprises stops associated with the first drive member in order to lock the latch in its open and closed positions, and in that one starting roller each is supported on the first and second drive members and is controllable by starting cams mounted in the conveying path of the holding frame.

This design allows compactness easily implemented into arbitrary holding frames or with which they may be easily retrofitted. High operational reliability is achieved not only on account of automatic, purely mechanical operation implemented by the starting rollers, but also because of the securing rail which locks the latch into its open and closed positions against unintended pivoting motions. All movable components being only rotatable or pivotable, they may be manufactured with simple machinery and prefinished, and commercially available materials may be employed extensively.

The drive members being kingpins affixed to a lever jointly pivotable with the latch or the securing rail, the levers exert large torques and actuation forces. By means of suitable displacement directions of the levers relative to each other and to the latch or securing rail, the latter are mounted compactly and advantageously as regards the forces in the housing.

Whereas the securing rail is prestressed by springs in its retention position, the latch can only pivot if previously the securing rail did reach a release position by means of its start roller moving against the spring force. Because of the prestressed spring, the latch shall also be locked if the securing rail is not constrained to return to its retention position, whereby the kingpin associated with the latch in each instance will fall into its clearance corresponding to its closed or open position.

In a preferred embodiment, the system comprises a braced housing affixed to the holding frame and bearing the seat for the connection component and from which only the start rollers resting on the kingpin are projecting.

Moreover the housing transmits the forces exerted by the workpiece on the system depending on the rotational position of the holding frame, into this holding frame. The latch upper side being guided at and resting on an end wall bracing the housing, the pivot bearing of the latch remains extensively free of workpiece gravitational forces in instances of critical loads.

Appropriately the housing will be slender and shall match its width to the cross-sectional dimensions of the holding frame. The housing length may be kept slight provided the pivot shafts of the latch and of the securing rail as well as the kingpins attached to them be mounted each compactly near the mutually opposite support plates.

An illustrative embodiment of the locking system of the invention is elucidated below in relation to the drawings.

Figure 1:
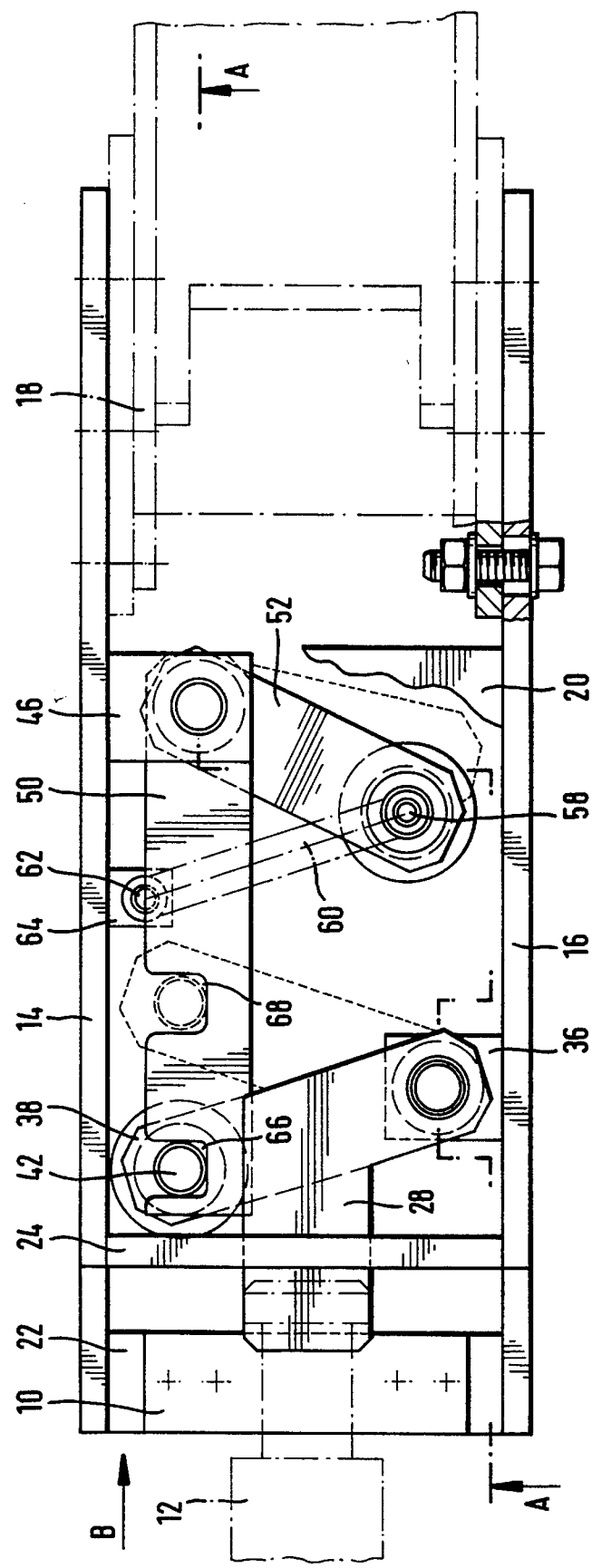
FIG. 1 is a topview of the locking system.

The locking system of the invention comprises two vertical support plates 14, 16 belonging to a downward open housing, the ends of said plates where called for being upwardly angled and being boltable to a holding frame 18. Both support plates 14, 16 are rigidly joined by a cover plate 20, in the region of the seat 10 projecting at the end face by a horizontal base plate 22 and at the housing end-face end by a vertical sealing plate 24. The seat 10 is positioned by setpins 26 onto the base plate 22 to which it is screwed. The end to be locked of a connection component 12 (in this case the end of a enameling beam) rests by means of a segment of tapering diameter in the matching seat 10 and projects by a thicker end in the direction of the housing.

Figure 2:
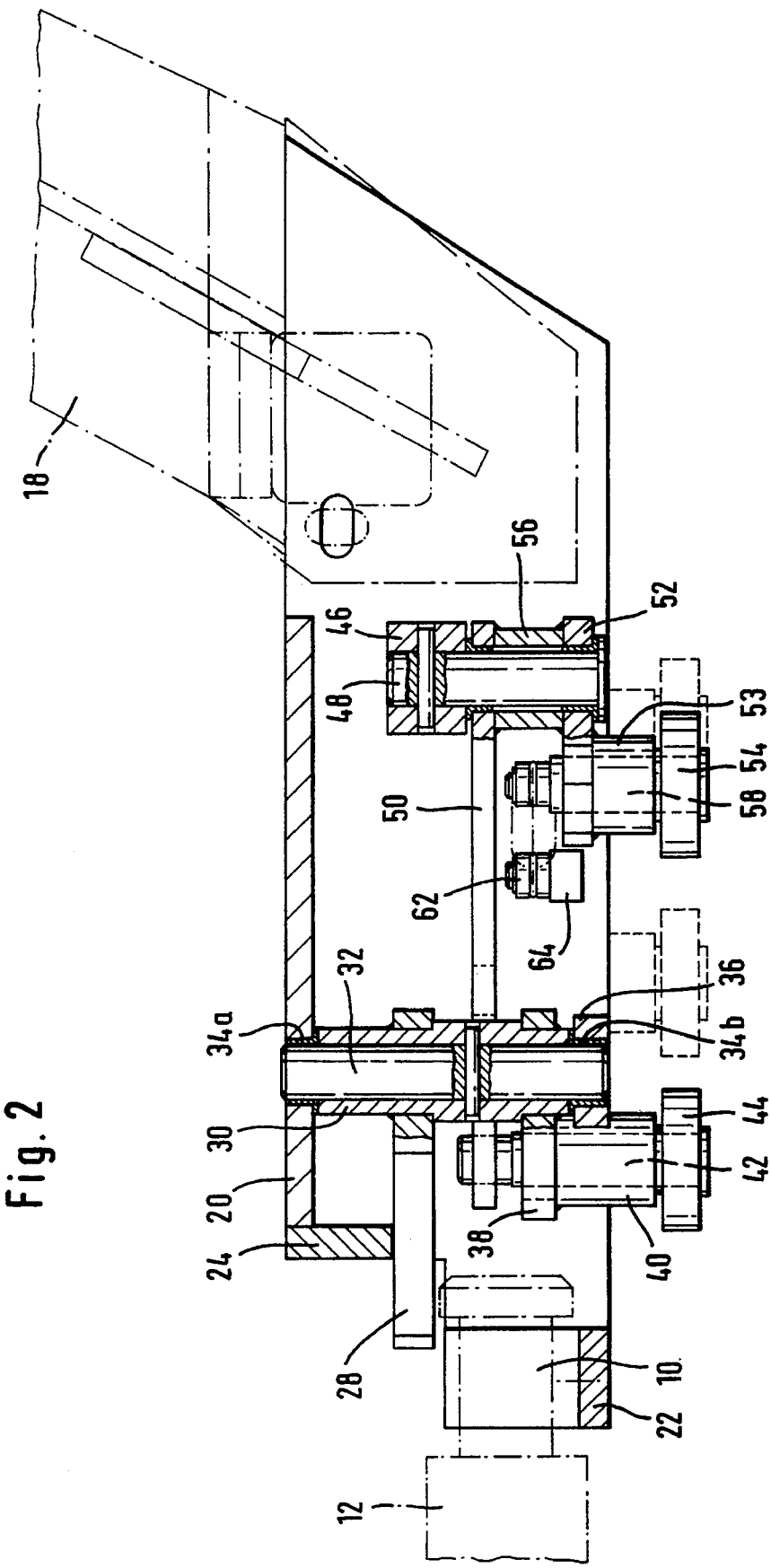
FIG. 2 is a vertical section of the locking system along line A—A of FIG. 1.
Figure 3:
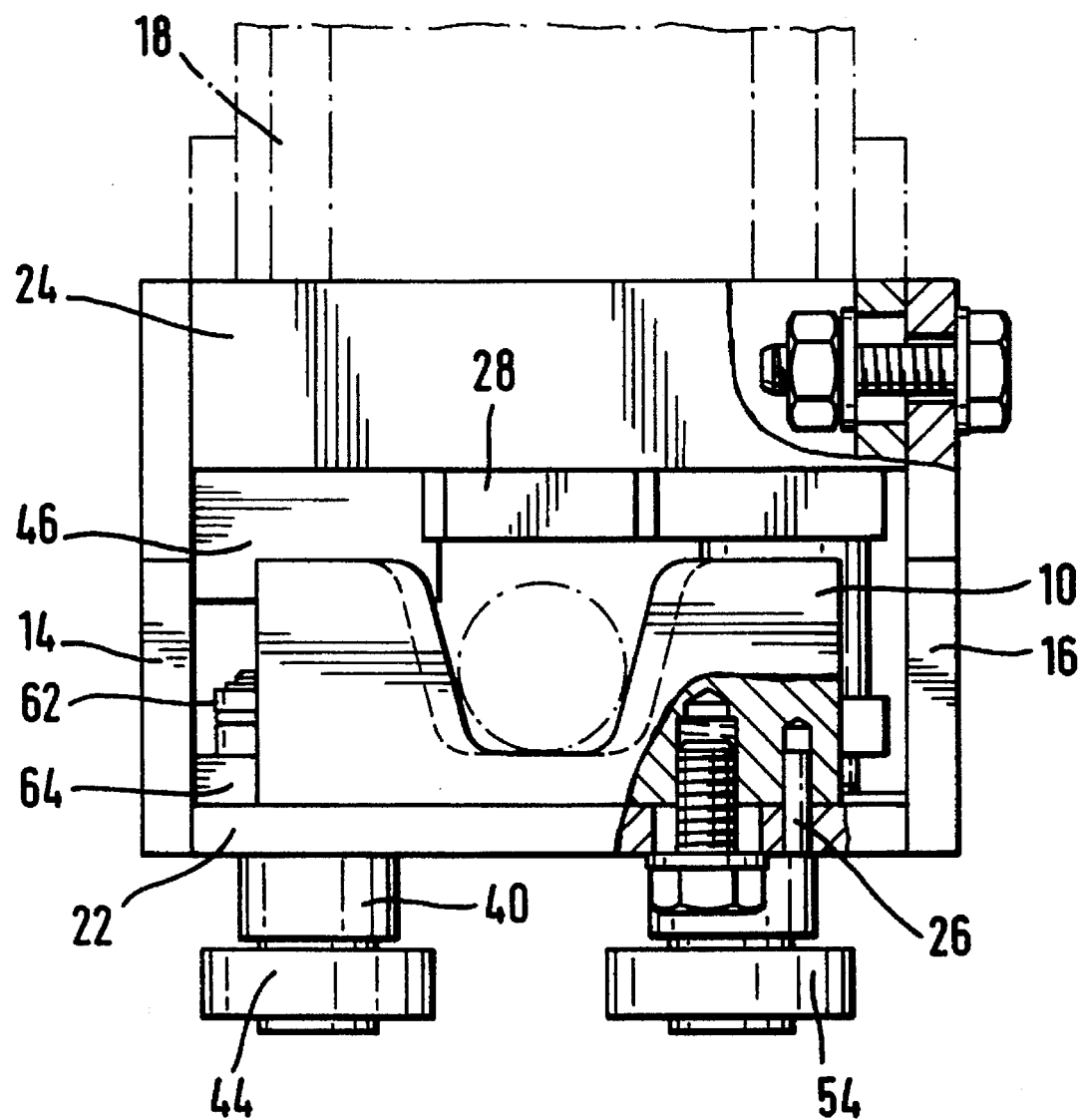
FIG. 3 is an end elevation viewed in the direction of the arrow B of FIG. 1.

An angled latch 28 is pivotable between its closed position shown in FIGS. 1 through 3 wherein it covers the seat 10 as well as the end collar of the connection component 12 on one hand, and on the other hand an open position shown by dashed lines in FIG. 1, about the vertical axis of a pivot bolt 32. During its horizontal displacement, the latch 28 is guided along the lower side of the end wall 24 and it is supported in its closed position in the manner shown in FIG. 2. The latch 28 is welded to a bush 30 which in turn is rigidly joined to the pivot bolt 32, for instance by one or more sets of transverse pins. By means of a collar bush 34a made of a suitable bearing material, the pivot bolt 30 rests in an opening of the cover plate 20 and together with a further collar bush 34b it rests in an aperture of an adapter 36 starting from the lower end of the support plate 16.

A lever 38 welded to the lower part of the bush 30 is the pivot drive for the latch 28 and bears a vertical kingpin 42 in the vicinity of its free end; said lever 38 furthermore is welded to a bush 40 enclosing the kingpin 42. A first start roller 44 is rotatably supported on the lower end of the kingpin 42 projecting from the lower housing end, whereas the upper free end above the lever 38 illustratively tapers to engage clearances of a securing rail described in further detail below.

In the shown embodiment, the direction of displacement of the lever 38 corresponds to that of the end of the latch 28 supported by the bush 30 on the pivot bolt 32. Preferably the length of the lever 38 is only slightly less than the spacing between the housing support plates 14, 16. FIG. 1 shows further that the pivot range or arc of the kingpin 42 mounted to the free lever end runs substantially parallel to and near the support wall 14. The bush 30 encloses the pivot bolt 32 over all its length between the collar bushes 34a, 34b. A set of transverse pins indicated in FIG. 1, which may correspond to that shown in the drawing between the bush 30 and the pivot bolt 32, may be used to rigidly join the kingpin 42 and the bush 40 welded to the lower side of the lever 38.

A vertical kingpin 48 held for instance by pin means is present near the housing end away from the seat 10 still underneath the cover plate 20 in a borehole of an extension 46 starting at the support plate 14. A welded pivot unit composed of one end of a securing rail 50, a bush 56 and a lower lever 52 rests on the lower and free segment of the kingpin 48. Various directions of displacement between the securing rail 50 and the lever 52 rigidly affixed to it are shown in FIG. 1.

A common seat borehole for a kingpin 58 is present near the free end of the lever 52 and for a bush 53 welded to its underside, said kingpin 58 being rigidly joined to the lever or the bush, for instance by pinning. A second start roller 54 rests in such manner on the end of the kingpin 58 projecing downward from the housing that when the start roller moves past a stationary control cam, the lever 52 and the securing rail 50 rigidly joined to it can be made to pivot across the pivoting range indicated by dashed lines in FIG. 1.

The upper end of the kingpin 58 is connected by a spring 60 indicated in FIG. 1 to a bolt 62 seated on an extension 64 of the support plate 14. The spring 60 prestresses the securing rail 50 into its holding position shown in FIG. 1, wherein its lateral clearances 66, 68 engage the kingpin 42 associated as the drive member with the latch 28 either in the closed or open latch position. Accordingly the latch 28 is secured in both its end positions.

The open side of the clearances 66, 68 is near the support plate 14 in the retention position of the securing rail 50, as a result of which the latch is additionally secured and moreover space is saved in the housing.

Stationary control cams are mounted in the path of the start rollers 44, 54 mounted to the locking system in the area of work stations at which a holding frame of the conveyor shall receive or release the workpieces being processed. When, during the conveying motion of the holding frame the locking system affixed to it moves over a first control cam which actuates the roller 54, then first the securing rail 50 will pivot against the prestressed spring into its release position. As a result the kingpin 42 rigidly joined to the latch 28 is released and the start roller 44 resting on said kingpin can then be pivoted by a corresponding second stationary control cam for instance into the closed position.

Even though for safety reasons a constrained pivoting motion of the securing rail is preferred over the full duration of the motion of the latch 28 between the closed and open positions, the first control cam driving the start roller 54 of the securing rail 50 however already may terminate at a location where the second control cam for the start roller 44 of the latch 28 has just initiated the pivoting motion of said latch because, inevitably on account of the return spring force exerted on it, the securing rail 50 engages the kingpin 42 of the latch 28 into one of its clearances 66 or 68.

I claim:

1. A locking system at a mounting structure, ie a holding frame displaced by a conveying system, for a connection component (12) of a workpiece being processed, comprising a seat (10) for the connection component (12) and a latch cooperating with the seat (10), characterized in that the latch (28) pivotable between an open position and a closed position relative to the seat (10) is solidly joined to a first drive member (42), a securing rail (50) pivotable parallel to the latch's pivoting plane is pivotable between a retention position and a release position and is joined to a second drive member (58) and comprises stop means (66, 68) associated with the first drive member (42) in order to lock the latch (28) into its open position and its closed position, and a start roller (44, 54) rests on the first and on the second drive member (42, 58) resp. and is controlled by start cams mounted in the conveyance path of the holding frame (18).

2. Locking system defined in claim 1, characterized in that the first and second drive members resp. consist of a kingpin (42, 58) running parallel to the pivot shaft of the latch (28) and the pivot shaft of the securing rail (50), said kingpin being resp. affixed to a lever (38, 52) pivoting jointly with the latch (28) or the securing rail (50).

3. Locking system defined in claim 2, characterized in that the kingpin (42) constituting the first drive member forms at its free end a pivot bearing for the start roller (44) engaging the securing rail (50) in locking manner by means of the stops (66, 68) by part of its residual length, in particular at its other, free end.

4. Locking system defined in claim 1, characterized in that the stops of the securing rail (50) are lateral clearances (66, 68).

5. Locking system defined in claim 1, characterized in that the securing rail (50) is prestressed into its retention position by springs (60).

6. Locking system defined in claim 1, characterized in that it comprises a braced housing connected to the holding frame (18), the seat (10) for the connection component being mounted to the free end of said housing from which only the start rollers (44, 54) resting on the kingpins (42, 58) as well as the latch (28) in a closed position covering the seat (10) will be projecting.

7. Locking system defined in claim 6, characterized in that the housing comprises two lateral support plates (14, 16) affixable to the housing and which are connected to each other by cross-bracings (22, 24) and by a cover plate (20).

8. Locking system defined in claim 1, characterized in that the latch (28) is guided—between its ends while resting its top side against an end wall (24) that braces the lateral support plates (14, 16)—into its closed position over the seat (10) where it is supported.

9. Locking system defined in claim 1, characterized in that the latch (28), and the lever (38) pivoting with it, are affixed while axially apart on a common bush (30) through which passes a kingpin (32) resting in the cover plate (20) and in an adapter (36) beginning at a support plate (16), said kingpin being connected to the bush, in particular by pinning.

10. Locking system defined in claim 1, characterized in that the securing rail (50) and the lever (52) pivoting with it are rigidly joined by a spacer bush (56) and rest on a kingpin (48) affixed in a sideways adapter (46) of a support plate (14).

11. Locking system defined claim 1, characterized in that the pivot shafts of the latch (28) and of the securing rail (50) as well as the kingpins (40, 58) affixed thereto by the levers (38, 52) inclusive their particular pivoting ranges each are arranged near the mutually opposite support plates (14, 16) and thereby are mounted in space-saving manner in the longitudinal direction of the housing.

12. Locking system at a holding frame displaced by a conveyance system for a lacquer traverse, ie an enameling cross-beam affixed to an automobile body, characterized in that
one locking system each defined in any of the above claims is connected at the free lower ends of the holding frame (18) enclosing in spaced manner the body, the seats (10) of the two systems facing each other and their start rollers downwardly projecting from the system housing being controlled by start cams mounted in the conveyance path of the holding frame.

* * * * *